US007917123B2

(12) United States Patent
Juntunen

(10) Patent No.: US 7,917,123 B2
(45) Date of Patent: Mar. 29, 2011

(54) METHOD AND ARRANGEMENT FOR REALIZING A PREPAID SUBSCRIPTION AND A PREPAYMENT TERMINAL AND A CELLULAR NETWORK TERMINAL UTILIZING THE METHOD

(75) Inventor: Esa Juntunen, Irving, TX (US)

(73) Assignee: Nokia Corporation, Espoo (FI)

( * ) Notice: Subject to any disclaimer, the term of this patent is extended or adjusted under 35 U.S.C. 154(b) by 171 days.

(21) Appl. No.: 10/867,191

(22) Filed: Jun. 14, 2004

(65) Prior Publication Data

US 2004/0266482 A1 Dec. 30, 2004

(30) Foreign Application Priority Data

Jun. 26, 2003 (FI) .................................... 20030948

(51) Int. Cl.
*H04M 1/66* (2006.01)
(52) U.S. Cl. ......... 455/411; 455/405; 455/406; 455/410
(58) Field of Classification Search ............... 455/412.2, 455/410, 411, 406, 556.1, 557, 558, 466; 705/61, 65–68, 72
See application file for complete search history.

(56) References Cited

U.S. PATENT DOCUMENTS

| 6,859,650 | B1* | 2/2005 | Ritter .............................. 455/406 |
| 7,551,913 | B1* | 6/2009 | Chien ............................. 455/411 |
| 2001/0001321 | A1* | 5/2001 | Resnick et al. .................. 705/17 |
| 2002/0004374 | A1* | 1/2002 | Kantola et al. .................. 455/90 |
| 2002/0085511 | A1* | 7/2002 | Koponen et al. ............... 370/315 |
| 2002/0107791 | A1* | 8/2002 | Nobrega et al. .................. 705/39 |
| 2003/0086545 | A1* | 5/2003 | Ruckart et al. ............. 379/114.2 |
| 2004/0019564 | A1* | 1/2004 | Goldthwaite et al. .......... 705/44 |
| 2004/0030647 | A1* | 2/2004 | Hansen et al. .................. 705/40 |
| 2004/0199474 | A1* | 10/2004 | Ritter .............................. 705/65 |
| 2007/0022472 | A1* | 1/2007 | Ritter et al. ....................... 726/7 |
| 2007/0099595 | A1* | 5/2007 | Koch et al. .................... 455/405 |
| 2007/0214083 | A1* | 9/2007 | Jones et al. ..................... 705/41 |

FOREIGN PATENT DOCUMENTS

| EP | 0698987 A2 | 2/1996 |
| GB | 23392625 A | 2/2000 |
| WO | WO-01/48716 A1 | 7/2001 |
| WO | WO-01/63569 A1 | 8/2001 |
| WO | WO-01/88861 A1 | 11/2001 |

* cited by examiner

*Primary Examiner* — Dai A Phuong

(74) *Attorney, Agent, or Firm* — Harrington & Smith

(57) ABSTRACT

The object of the invention is a method and arrangement including equipment, with which it is possible to add right of use into a SIM card located in a cellular terminal of a cellular network. According to the invention the addition is made with the aid of a prepayment terminal according to the invention, and the possessor of the terminal pays in a desired manner the provided addition of right of use to the legal person, who acts as the intermediary. The cellular network operator bills the legal person, who provided the addition, by an amount corresponding to the added right of use.

28 Claims, 3 Drawing Sheets

METHOD AND ARRANGEMENT FOR REALIZING A PREPAID SUBSCRIPTION AND A PREPAYMENT TERMINAL AND A CELLULAR NETWORK TERMINAL UTILIZING THE METHOD

FIELD OF THE INVENTION

The object of the invention is a method for adding right of use to a SIM card of a cellular network terminal via a legal person. An object of the invention is also an arrangement, a prepayment terminal and a cellular network terminal utilised in the method. An object of the invention is also a software application running in a cellular network operator's information system.

BACKGROUND OF THE INVENTION

The use charge paid for the use of a telephone can be charged in different ways. In connection with fixed networks the operator always knows the address of the subscriber. Then no great risks relate to the billing, as any unpaid telephone bills can be taken in execution from a person in possession of the subscription. Therefore the use charge of fixed telephone subscriptions is generally invoiced afterwards.

As cellular telephones become more general they present new challenges regarding the collection of subscribers' use charges. A successful collection is also important because a bill generated by a cellular telephone can become very high already in a short time, as the use charges per time unit are relatively high compared to the use charges in the fixed network. In addition a portable terminal is readily used more often than a fixed telephone subscription. Further, if the address information of a cellular telephone user is incomplete or out-of-date it can be inconvenient to collect the outstanding claims. Various prepaid subscriptions are generally used in order to solve the above problem. In these arrangements a cellular telephone's user pays in advance a certain fee to his/her network operator for the use of the telephone. The user may utilise his/her cellular phone only as long as there is a prepaid amount left. Such prepaid subscriptions are in some countries the most common way to buy a cellular telephone subscription.

One generally used way to realise a prepaid subscription is to use a disposable SIM card (Subscriber Identity Module). In this arrangement the SIM card may be used as long as there has been originally stored money/right of use in it. When the right of use expires it is thus necessary to acquire a new SIM card. The production and distribution of such disposable SIM cards represent extra costs to the network operator selling and distributing such SIM cards. Further, the user must remember to buy a new SIM card in good time in order to be able to replace the SIM card when the operating time of the previous SIM card expires.

Another common way to charge the advance payment is to add right of use to the SIM card via the serving cellular network. Then the terminal's user must have an account in a bank, a credit company or a company providing payment services. When the operating time of the SIM card is about to expire the terminal's user must establish a data transmission link to his/her credit company. If there is cover or credit on the user's account, then the amount defined by the user can be transferred to the account of the network operator during the data communication or after it. Then the network operator increases the balance/time of use by the corresponding amount in its own data system. However, this arrangement requires that the terminal's user has an account in some credit company which can be electrically utilised via the data network. Thus such users, which are located outside an electrical data network of this kind, are not able to utilise this approach.

SUMMARY OF THE INVENTION

An object of the invention is to present a method and an arrangement, with which right of use can be loaded into a SIM card in a cellular network's terminal without requiring the user to have an electrically chargeable account in a service company, bank or credit company.

The objects of the invention are attained by a method and an arrangement where additional right of use can be loaded into the terminal in enterprises carrying on different sales or service activities. Said enterprises have available equipment, with which the right of use of a cellular network's terminal of a buyer can be increased in connection with the payment of some other service/purchase. The terminal's user can pay the charge relating to said right of use to the party supplying the right of use, either in cash, by credit or by different charge cards. The payment of the paid right of use is transferred to the operator's account via the information systems of the service supplier.

An advantage of the present invention is that a reloadable SIM card can be utilised in such circumstances where it is impossible or unnecessary to verify the credit information of the terminal's user.

A further advantage of the present invention is that there will be no manufacturing and distribution costs of the disposable SIM cards.

An additional advantage of the invention is that it can find worldwide use regardless of the geographical location of the terminal's user or the network operator.

A further advantage of the invention is that the cellular terminal's user does not have to establish a data communication link to the service operator when operating time is added.

An additional advantage of the invention is that it makes it possible to keep a check on misuse and criminality relating to the prepayment system.

The method according to the invention for adding right of use to a SIM card is characterised in that it comprises electrically reading of identification data from the cellular terminal performed by a legal person, verifying the read identification data, adding right of use to the SIM card and providing information about this, and electrically charging an amount corresponding to the added right of use from the legal person who performed the reading of the identification data of the cellular terminal.

The arrangement according to the invention for adding right of use to a SIM card in a terminal of a cellular network is characterised in that the arrangement comprises a prepayment terminal at a legal person.

The prepayment terminal according to the invention for adding right of use to a SIM card of a cellular network terminal is characterised in that it comprises
  a means for electrically reading identification data of the cellular terminal,
  a means for providing a telephone number of a SIM card,
  a means for transferring the identification data of the cellular terminal and the SIM card via a cellular network to a data system of a network operator, and
  a means for displaying the successful addition of right of use.

The terminal according to the invention is characterised in that it comprises a means, with which an identification of a cellular terminal is arranged to be verified before new rights of use are loaded into a SIM card of the cellular terminal.

The software means according to the invention in an information system of a cellular network operator are characterised in that the software means comprise procedures for receiving data about a cellular terminal and a SIM card connected to it from a prepayment terminal connected to the cellular network, whereby the prepayment terminal is in the possession of a legal person, procedures for approving the addition of right of use on the basis of the received information, procedures for realising the addition of right of use in the information system and for transmitting the addition to the SIM card of the terminal, and procedures for electrically charging the added right of use from said legal person Some advantageous embodiments of the invention are presented in the independent claims.

The basic idea of the invention is as follows: With the aid of the method and the arrangement according to the invention it is possible to load added right of use into a cellular terminal of a cellular network, advantageously in connection with some kind of purchase. The seller of a service or goods, the legal person, possesses a prepayment terminal according to the invention being able to identify the cellular terminal of the cellular network, for which added right of use is being purchased. The identification can advantageously utilise the RFID circuit (Radio Frequency Identification) mounted in the cellular terminal. When the prepayment terminal possessed by the legal person has identified the cellular terminal it is further possible to ask the cellular terminal's user to give his telephone number of his/her terminal/SIM card. When the user and the device have been identified, then the request for added right of use required by the cellular terminal's user is transmitted to the information system of the service operator. If the presented request can be accepted then the network operator immediately acknowledges that it has received and accepted the presented request, advantageously by an SMS message (Short Message Service). The acknowledgement of the network operator means that right of use has been added by the amount requested by the cellular terminal's user. The cellular terminal's user pays the purchased added right of use in the same manner as any other services or goods, which he/she has bought at the same time. On the other hand, the network operator charges an amount corresponding to the added right of use from the legal person, which has provided the service.

BRIEF DESCRIPTION OF THE DRAWINGS

The invention is described in detail below. The description refers to the enclosed figures, in which.

DETAILED DESCRIPTION

Figure 1:
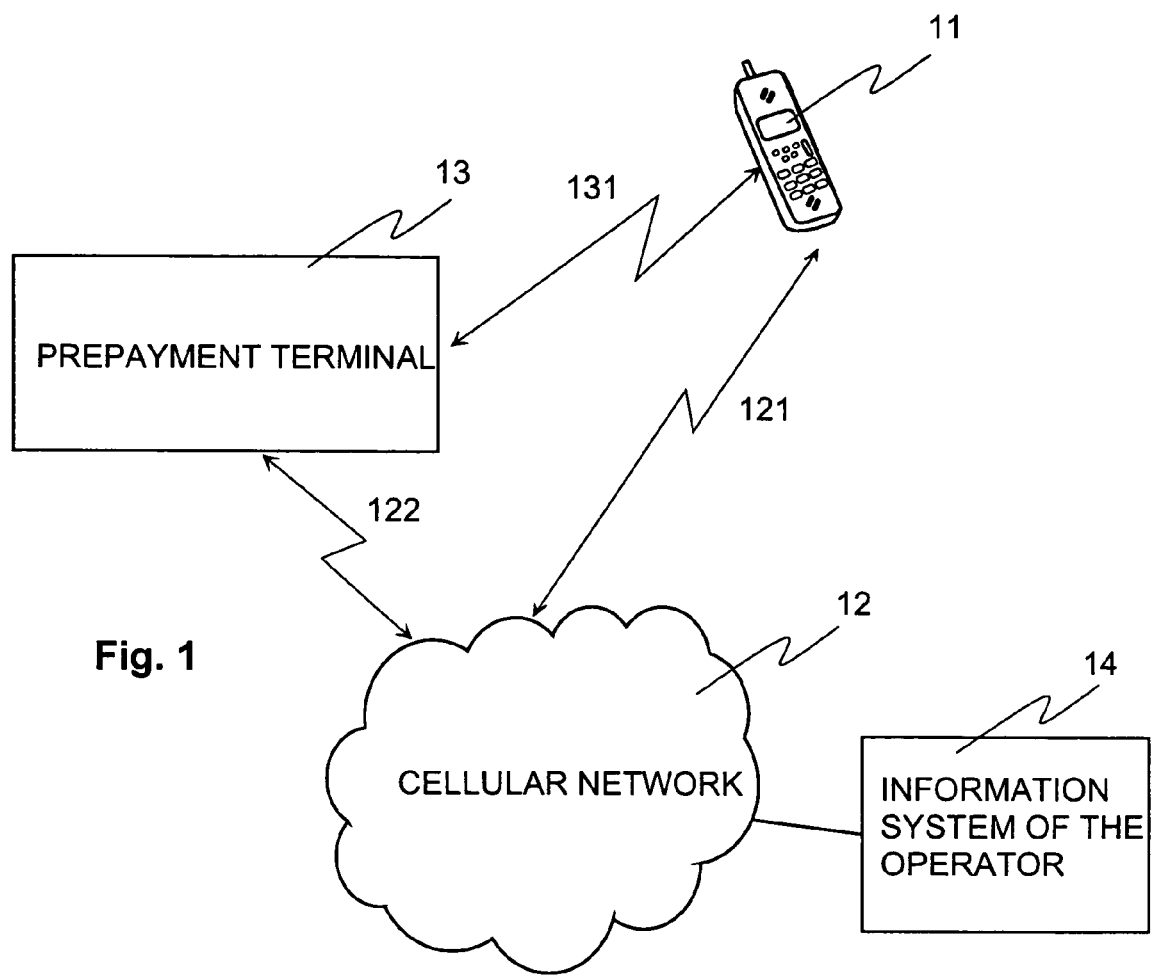
FIG. 1 shows as an example the devices belonging to the arrangement according to the invention.

FIG. 1 show as an example the different devices and systems required to realise the invention. The reference numeral 12 shows a cellular network, which advantageously is a GSM network (Global System for Mobile communications). A terminal 11 is connected via a link 121 to the cellular network 12. In the example of FIG. 1 the cellular terminal 11 contains a SIM card, which can be reloaded and which requires a prepayment. Its operating period is limited to that time which is left after previous periods of use. As the available operating time is running out, then either the cellular terminal's 11 SIM card must be loaded with new operating time, or alternatively it is necessary to acquire a new disposable SIM card.

The present invention is advantageously applied in a situation, where one uses a disposable SIM card, which can be reloaded, but in which the user of the cellular terminal 11 has no possibilities to directly buy added operating time for his/her cellular terminal 11 via the cellular network 12. This problem is solved with a prepayment terminal 13 according to the invention. The prepayment terminal 13 is located in the premises of a legal person. Some examples of such legal persons are shops, service stations, kiosks and post offices. Advantageously the prepayment terminal 13 according to the invention communicates via the cellular network 12 with an information system 14 of the cellular network operator of the possessor of the cellular terminal. In the first step the prepayment terminal 13 reads and verifies the information about the possessor of the cellular terminal 11 and the SIM card mounted in the terminal. The object of this is to prevent misuse, such as the use of stolen terminals. Advantageously the cellular terminal is identified by reading data from an individual RFID identification circuit mounted in the cellular terminal 11.

The data/identity contained in the RFID circuit connected to the cellular terminal 11 can be advantageously the individual ICC number (Integrated Circuit Card) of the SIM card connected to the terminal. Network operators use this number to identify the user. When desired, the network operator can distribute the RFID circuits together with the SIM card. This arrangement will further facilitate the logistics of the operator, and it will not be necessary to separately distribute or send individual RFID circuits to the users.

When the data of the terminal 11 have been read, and the data of the SIM card in the cellular terminal have been verified, then the prepayment terminal 13 in the next step will transmit the information relating to the cellular terminal 11, and how much new additional right of use is requested to the cellular terminal 11, to the information system of the operator serving the cellular terminal 11. If the presented addition request can be accepted, then the network operator's information system 14 adds right of use into the cellular terminal 11 by the amount reported by the pre-payment terminal 13. Corresponding information is also transmitted to the terminal 11, advantageously as an SMS message. The possessor/user of the cellular terminal 11 pays the added right of use to that legal person, who possesses the pre-payment terminal 13. The payment can be made as cash, by cash cards or credit cards, or by a credit provided by the legal person. The network operator charges the legal person providing the service for the added right of use, in a manner which is defined case by case.

Figure 2:
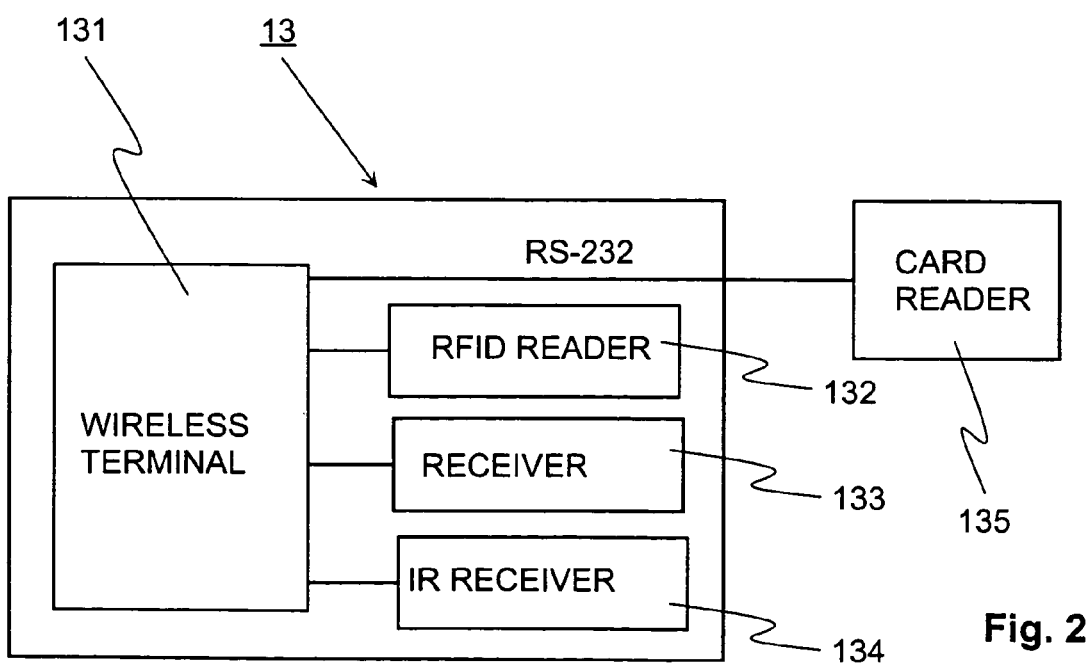
FIG. 2 shows as an example a prepayment terminal according to the invention.

FIG. 2 shows as an example the main components included in a prepayment terminal 13 according to the invention. Advantageously the prepayment terminal 13 includes a wireless terminal 131, with which the prepayment terminal 13 transmits and receives messages from the cellular network 12. This wireless link 122 can of course be replaced by a fixed communication link, if the service of the cellular network 12 is unavailable, or if it is not desirable to use it. Advantageously the prepayment terminal 13 includes an RFID reader 132. With the aid of this RFID reader 132 it is possible to read the data of an RFID circuit according to the invention located in the terminal 11. Advantageously this data is transmitted via the wireless terminal 131 of the prepayment terminal 13 to the information system 14 of the network operator, in order to identify the terminal 11 and its user.

The reference numeral 133 represents a short range radio receiver, for instance a so called Bluetooth receiver, and the reference numeral 134 represents an IR receiver (Infra Red). They are used in such embodiments of the invention where no RFID reader is utilised. In these alternative embodiments the identification data of the terminal 11, required in the method according to the invention, can be received via the short range radio receiver 133 or the IR receiver 134.

In the example of FIG. 2 a credit card/cash card reader device 135 is further connected via an RS-232 connection to the prepayment terminal 13. In an advantageous embodiment of the invention the payment, which adds right of use, is made utilising this card reader 135. When the data of an allowed credit card/cash card have been read with the aid of the card reader 135 the data stored in the card reader will be transferred together with the desired addition of right of use to the information system 14 of the network operator. On the basis of these data the network operator charges a corresponding amount from the credit/cash card account read by the reader device 135. This embodiment can be applied when the self-service principle is used.

Figure 3:
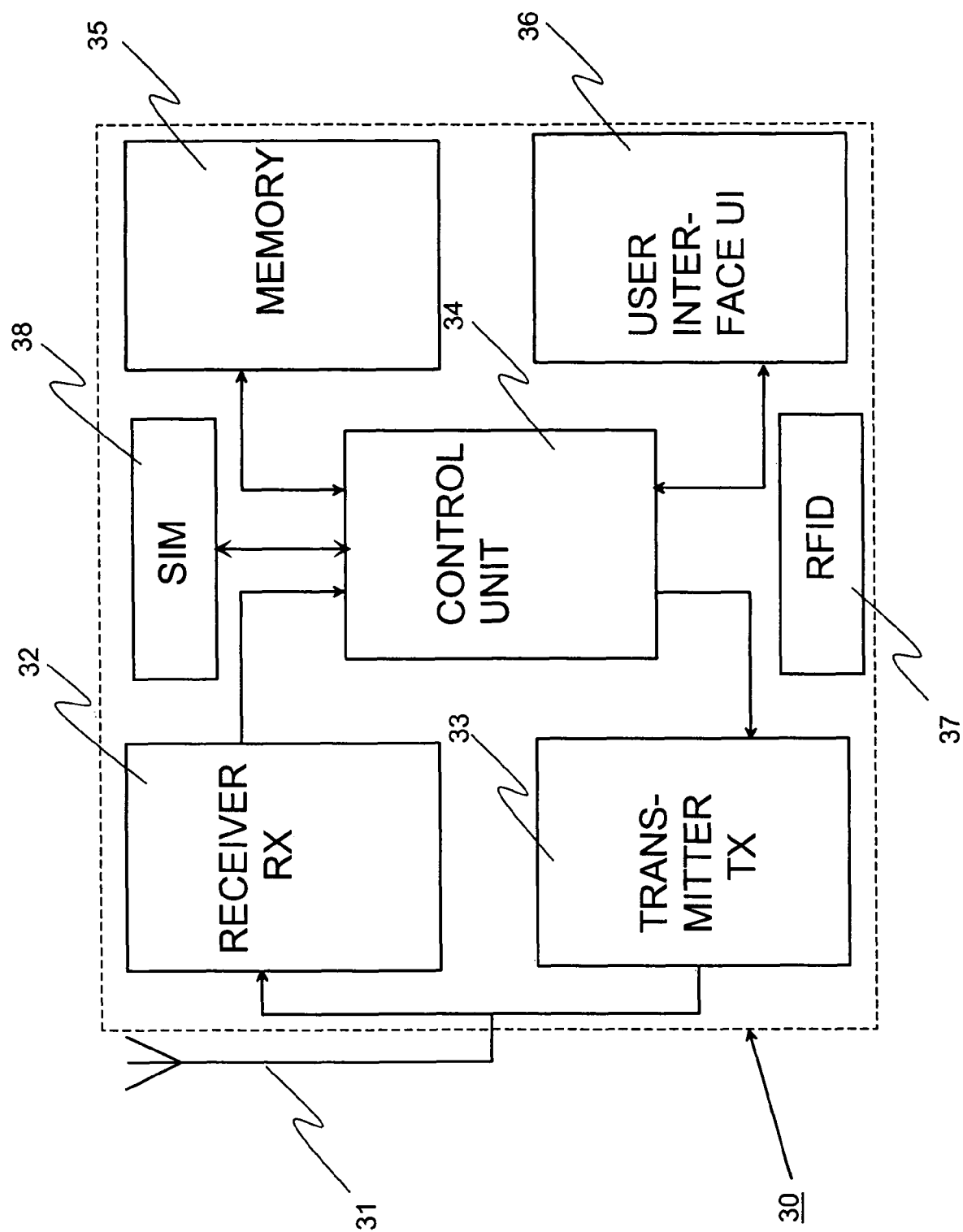
FIG. 3 shows as an example a cellular network's terminal according to the invention.

FIG. 3 shows as an example the main components of a wireless cellular terminal 30 belonging to an arrangement according to the invention. More right of use can be purchased to this terminal 30 according to the invention. The cellular terminal 30 shown in FIG. 3 uses an antenna 31 in transmitting and receiving from the cellular network 12. The reference numeral 32 represents those means which form the receiver RX, with which the wireless terminal 30 receives messages from the cellular network 12. The receiver RX comprises prior art means for all received messages or signals.

The reference numeral 33 represents those means which form the transmitter TX of the wireless cellular terminal 30. The transmitter means 33 perform for the transmitted signal all signal processing procedures, which are required during operation in the cellular network 12.

The cellular terminal 30 comprises a control unit 34 controlling its operation. It controls the operation of all main components included in the cellular terminal 30. It controls both the receiving and transmitting operations. It also controls both the terminal's user interface UI 36 and the memory 35 belonging to the terminal. A SIM card 38 connected to the cellular terminal 30 has also a connection to the control unit 34.

The cellular terminal 30 according to the invention also contains an RFID circuit 37. With the aid of the reader device 132 in the prepayment terminal 13 it is possible to transfer the data contents of this RFID circuit 37 to the prepayment terminal 13.

To a person skilled in the art it is obvious that the functions of the RFID circuit 37 may be replaced by an IR transmitter or by a short range radio link, such as Bluetooth link, which are not shown in the example of FIG. 3. However, an advantage of the RFID circuit 37 is that the data/identity according to the invention resides within the RFID circuit 37. This enhances the operating security of the cellular terminal compared to other alternative embodiments.

The cellular terminal 30 also comprises a SIM card 38. The SIM card 38 contains the essential data about the actual subscription of the cellular network. Such data are for instance the telephone number allocated to the SIM card, and in the case of prepayment, also a register showing the amount of the right of use still available. This register is updated, or the right of use is added with the method according to the invention.

Figure 4:
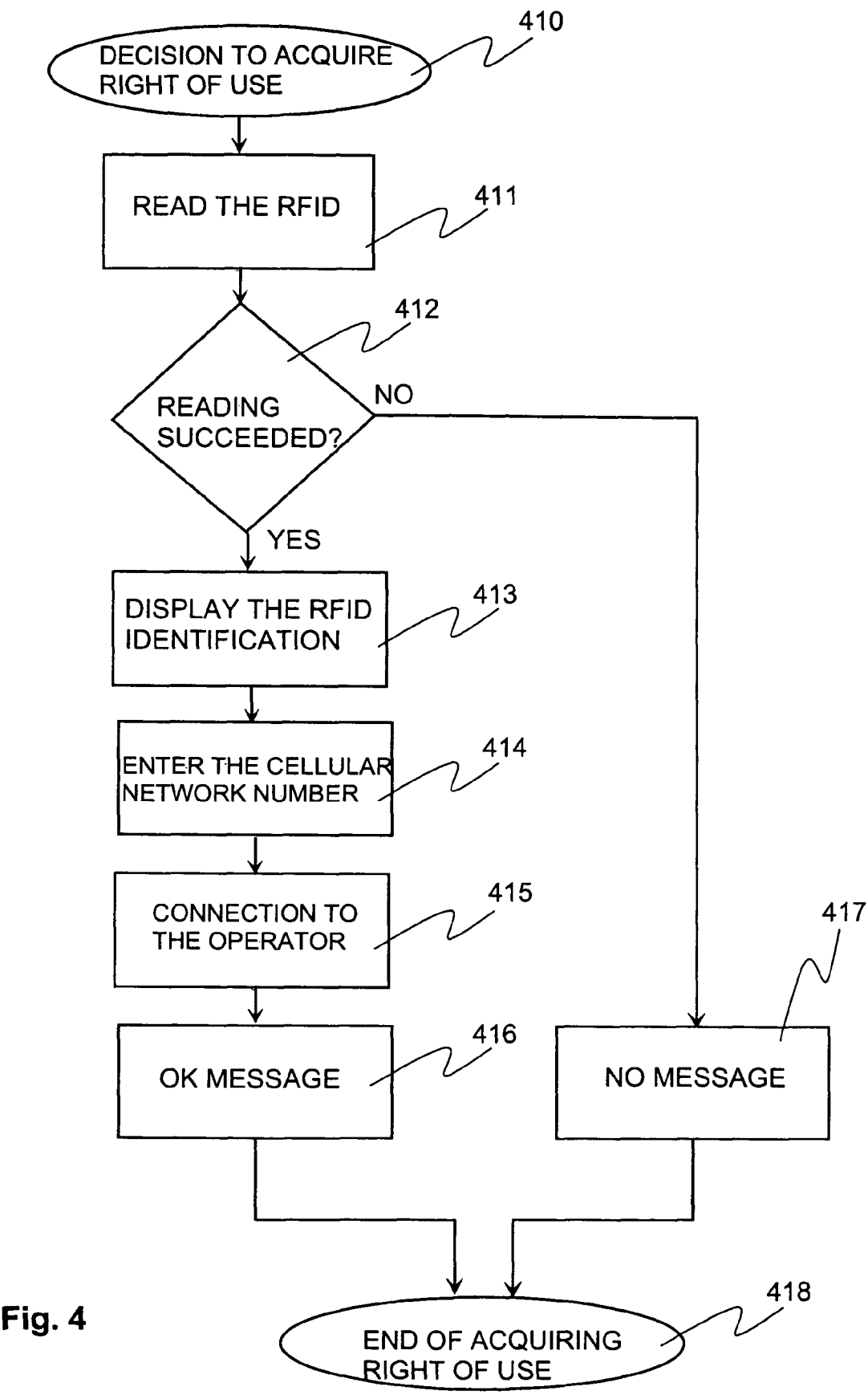
FIG. 4 shows as an exemplary flow diagram the main steps of the process according to the invention in order to purchase added right of use.

The exemplary flow diagram of FIG. 4 shows an advantageous way to utilise the method according to the invention. In step 410 the possessor/user of the cellular terminal decides to acquire to his/her terminal an added right of use of a certain amount. Said possessor decides to acquire added right of use by using an arrangement according to the invention. Then the right of use must be acquired from a legal person possessing a prepayment terminal 13 according to the invention.

In the first step to acquire right of use the RFID reader 132 in the prepayment terminal 13 reads the data of the RFID circuit 37 in the cellular terminal 11, 30. Step 412 determines whether the reading of the terminal's RFID 37 was successful or not. If the reading operation failed, then the prepayment terminal 13 in step 417 outputs a NO-message. This message tells that the reading of data from the RFID 37 has failed. After said message the prepayment terminal 13 is controlled into a state 418, which shows that the purchase of added right of use is finished. If there is still a desire to purchase added right of use, then the process according to the invention must be restarted from the beginning with a new attempt to read the data in the RFID 37.

If step 412 determines that the reading of RFID data succeeded, then the process moves to step 413. In this step the display of the prepayment terminal 13 presents the data read from the RFID 37. In addition the prepayment terminal 13 advantageously asks whether the read data or identification is correct. The possessor/user of the cellular terminal 11, 30 accepts the displayed data if it is correct.

In step 414 the possessor/user of the cellular terminal 11 is asked as a further verification to present the telephone number, the identification of the SIM card used in the cellular terminal. Advantageously it is possible to correct the terminal's telephone number before the user finally accepts it.

When the user finally in step 414 has accepted the presented telephone number the process moves on to step 415, where the amount of the desired added right of use is presented/accepted, and all obtained/read data is transmitted to the network operator. The acquired added right of use can be a certain standard amount pre-set in the prepayment terminal 13. In another embodiment according to the invention the amount of the added right of use can be defined case by case. In both embodiments, when the acquired amount of added right of use has been determined, the prepayment terminal 13 will advantageously at the end of step 415 establish a contact via the cellular network 12 to the information system 14 of the network operator of the possessor of the terminal 11. Then the prepayment terminal 13 advantageously transmits both the cellular terminal's telephone number and the RFID identification data read from the cellular terminal 11 and the requested amount of added right of use to the information system 14 of said network operator.

In step 416 the network operator advantageously compares the received identification data with the data in its own information system 14. If this comparison gives as a result that a permissible user possesses the cellular terminal 11, then it transmits an OK message to the cellular terminal 11, 30 of the cellular network, advantageously as an SMS message. The message tells that the purchase of the added right of use has succeeded, and at the same time it advantageously also tells how much the right of use has been added. Advantageously the same information is simultaneously transmitted also to the display of the prepayment terminal 13.

Then the process to acquire the added right of use according to the invention is terminated in step 418. The payment for the acquired added right of use is then made for instance in the following way. In the first step the cellular terminal's user, i.e. the person acquiring the added right of use, pays in a desired way the amount of money corresponding to the added right of use to the legal person who provided the service. In the second step the network operator bills said legal person on the basis of the received information about the added right of use.

Above we describe some advantageous embodiments of the method and arrangement according to the invention. The invention is not limited to the embodiments described above, but the inventive idea can be applied also in other ways.

For instance, the cellular network can also be some other network than the GSM network presented in the example. Examples of other applicable cellular networks are the GPRS network (General Packet Radio Service), the UMTS network (Universal Mobile Telecommunication System), the IS-95 or the CDMA 2000 networks. It is also possible to utilise some other suitable communication method instead of an SMS message, such as a USSD message (Unstructured Supplementary Service Data). The inventive idea may be further applied in many different ways within the scope of the claims.

The invention claimed is:

1. A system comprising:
  a mobile terminal comprising:
    a subscriber identity module and
    a short range wireless component storing identification information comprising an identification of the subscriber identity module, wherein the short range wireless component stores identification information independently from the subscriber identity module and the identification information comprises an integrated circuit card number of the subscriber identity module; and
  a prepayment terminal located in a premises managed by a legal person, wherein the prepayment terminal is configured:
    to receive, independently of the subscriber identity module, the identification information stored in the short range wireless component;
    to receive an authorization for adding an amount of right to use for the subscriber identity module;
    to transmit the identification of the subscriber identity module and the authorized amount of right of use to a network operator; and
    to receive a first indication of a successful addition of the right of use to the subscriber identity module,
    where the prepayment terminal transmits the identification and receives the first indication through a communication link established between the prepayment terminal and the network operator and the communication link is independent of any data communication link that may exist between the mobile terminal and the network operator.

2. The system according to claim 1, wherein the short range wireless component comprises at least one of an infrared device, a radio frequency device, a radio frequency identification circuit and a Bluetooth device.

3. A method comprising:
  receiving, independently of a subscriber identity module, identification information stored in a short range wireless component of a mobile terminal at a prepayment terminal located in a premises managed by a legal person, wherein the identification information comprises an identification of the subscriber identification module of the mobile terminal, wherein the identification information comprises an integrated circuit card number of the subscriber identity module and the short range wireless component stores the identification information independently from the subscriber identity module;
  receiving an authorization for an amount of right of use for the subscriber identity module;
  transmitting the identification information and the authorized amount of right of use for the subscriber identity module to a network operator; and
  receiving a first indication of a successful addition of the right of use to the subscriber identity module,
  where transmitting the identification and receiving the first indication is performed through a communication link established between the prepayment terminal and the network operator and the communication link is independent of any data communication link that may exist between the mobile terminal and the network operator.

4. The method according to claim 3, wherein a corresponding network of the network operator comprises a cellular network,
  the mobile terminal comprises a cellular terminal, and
  transmitting the amount of right of use and the identification information from the prepayment terminal to the corresponding network operator comprises the prepayment terminal using a cellular network terminal configured to communicate with the network operator.

5. The method according to claim 3, further comprising displaying on the prepayment terminal the identification information.

6. The method according to claim 3, wherein receiving the identification information from the short range wireless component is performed by the legal person.

7. The method according to claim 3, further comprising wherein the first indication comprises a short message service message.

8. The method according to claim 3, further comprising in response to receiving the first indication a, displaying, on the prepayment terminal, a second indication of the successful addition.

9. The method according to claim 8, wherein the second indication comprises the amount of right of use successfully added to the subscriber identity module.

10. The method according to claim 3, wherein the short range wireless component comprises at least one of an infrared device, a radio frequency device, a radio frequency identification circuit and a Bluetooth device.

11. The method according to claim 3, further comprising receiving a request to add the amount of right of use.

12. The method according to claim 11, wherein receiving the request to add the amount of right of use comprises obtaining the amount of right of use to be added.

13. The method according to claim 11, wherein receiving the request comprises receiving a selection of one of a plurality of preset values.

14. The method according to claim 11, wherein receiving the request comprises receiving a user specifying a value.

15. The method according to claim 11, wherein receiving the request comprises the legal person specifying a value.

16. The method according to claim 11, wherein receiving the request is performed by the legal person.

17. The method according to claim 3, further comprising verifying the transmitted identification information by requesting that a user enter a corresponding phone number of the subscriber identity module on the prepayment terminal.

18. The method according to claim 17, wherein transmitting the amount of right of use to add and the identification information to the corresponding network operator is performed in response to the user correctly entering the phone number corresponding to the subscriber identity module.

19. The method according to claim 3, wherein receiving the identification information is performed in response to a stimulus.

20. The method according to claim 19, wherein the stimulus comprises at least one of an interrogation from the prepayment terminal and a user interacting with a user interface of the mobile terminal.

21. A method comprising:
receiving, independently of a subscriber identity module, identification information and an authorized amount of right of use for the subscriber identity module of a mobile terminal from a prepayment terminal located in a premises managed by a legal person, wherein the identification information comprises an identification of the subscriber identification module, wherein the identification comprises an integrated circuit card number of the subscriber identity module and the short range wireless component stores the identification information independently from the subscriber identity module;
adding the amount of right of use to the subscriber identity module; and
charging an amount corresponding to the added amount of right of use to an account of the legal person,
where receiving the identification information and the authorized amount of right of use is performed through a communication link established with the prepayment terminal and the communication link is independent of any data communication link that may exist between the mobile terminal.

22. The method according to claim 21, further comprising transmitting a first indication of a successful addition of right of use to the subscriber identity module.

23. The method according to claim 22, wherein the first indication comprises the amount of right of use successfully added to the subscriber identity module.

24. The method according to claim 22, wherein the first indication comprises a short message service message.

25. The method according to claim 21, further comprising transmitting to the prepayment terminal a first indication of a successful addition of right of use.

26. The method according to claim 25, wherein the first indication comprises the amount of right of use successfully added to the subscriber identity module.

27. The method according to claim 25, wherein the first indication comprises a short message service message.

28. The method according to claim 21, wherein receiving the amount of right of use and the identification information occurs over a cellular network.

\* \* \* \* \*